(12) United States Patent
Wang et al.

(10) Patent No.: US 12,327,382 B2
(45) Date of Patent: Jun. 10, 2025

(54) METHOD, ELECTRONIC DEVICE, AND COMPUTER PROGRAM PRODUCT FOR MODEL PROCESSING

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 18/112,589

(22) Filed: Feb. 22, 2023

(65) Prior Publication Data

US 2024/0242388 A1    Jul. 18, 2024

(30) Foreign Application Priority Data

Jan. 16, 2023   (CN) .......................... 202310077123.4

(51) Int. Cl.
 *G06T 9/00*   (2006.01)
(52) U.S. Cl.
 CPC .............. *G06T 9/001* (2013.01); *G06T 9/002* (2013.01)
(58) Field of Classification Search
 None
 See application file for complete search history.

(56) References Cited

U.S. PATENT DOCUMENTS

| | | | | |
|---|---|---|---|---|
| 12,015,776 B2 * | 6/2024 | Besenbruch | .......... | G06T 3/4046 |
| 12,022,077 B2 * | 6/2024 | Besenbruch | ........... | G06N 3/045 |
| 12,095,994 B2 * | 9/2024 | Besenbruch | ........... | H04N 19/91 |
| 12,160,579 B2 * | 12/2024 | Besenbruch | ........... | G06N 3/084 |
| 12,165,366 B2 * | 12/2024 | Zhang | .................. | H04N 21/816 |
| 12,256,075 B2 * | 3/2025 | Besenbruch | ........... | G06N 3/084 |
| 2020/0228836 A1 * | 7/2020 | Schwarz | .............. | H04N 13/117 |

(Continued)

OTHER PUBLICATIONS

L. Nanbo et al., "Object-Centric Representation Learning with Generative Spatial-Temporal Factorization," arXiv:2111.05393v1, Nov. 9, 2021, 24 pages.

(Continued)

*Primary Examiner* — Anand P Bhatnagar
(74) *Attorney, Agent, or Firm* — Ryan, Mason & Lewis, LLP

(57) ABSTRACT

Methods, electronic devices and computer program products for model processing are disclosed in embodiments herein. A method in an illustrative embodiment includes encoding first data of a point cloud model to obtain a first matrix, and encoding second data of the point cloud model to obtain a second matrix, where the first data and the second data are data of the point cloud model acquired from different angles. The method further includes respectively decomposing, by an equivariant encoder, the first matrix and the second matrix into a first equivariant matrix and a second equivariant matrix, and respectively decomposing, by an invariant encoder, the first matrix and the second matrix into a first invariant matrix and a second invariant matrix. The method further includes training the equivariant encoder and the invariant encoder based on the first equivariant matrix, the second equivariant matrix, the first invariant matrix, and the second invariant matrix.

20 Claims, 9 Drawing Sheets

(56) References Cited

U.S. PATENT DOCUMENTS

| | | | |
|---|---|---|---|
| 2023/0388502 A1* | 11/2023 | Besenbruch | G06T 9/002 |
| 2024/0078711 A1* | 3/2024 | Dean | G06F 16/1744 |
| 2024/0244242 A1* | 7/2024 | Lasserre | H04N 19/426 |

OTHER PUBLICATIONS

B, H. Zhang et al., "Mitigating Unwanted Biases with Adversarial Learning," arXiv: 1801.07593v1, Jan. 22, 2018, 7 pages.

J. C. Duchi et al., "Statistics of Robust Optimization: A Generalized Empirical Likelihood Approach," arXiv:1610.03425v3, Jun. 30, 2018 48 pages.

E. Creager et al., "Exchanging Lessons Between Algorithmic Fairness and Domain Generalization," ICLR 2021 Conference Blind Submission, Sep. 28, 2020, 19 pages.

C. R. Qi et al., "PointNet: Deep Learning on Point Sets for 3D Classification and Segmentation," arXiv:1612.00593v2, Apr. 10, 2017, 19 pages.

M. Aubry et al., "The Wave Kernel Signature: A Quantum Mechanical Approach to Shape Analysis," International Conference on Computer Vision Workshops, Nov. 2011, 8 pages.

M. M. Bronstein et al., "Scale-invariant Heat Kernel Signatures for Non-rigid Shape Recognition," IEEE Computer Society Conference on Computer Vision and Pattern Recognition, Jun. 2010, 8 pages.

J. Sun et al., "A Concise and Provably Informative Multi-Scale Signature Based on Heat Diffusion," Eurographics Symposium on Geometry Processing, Jul. 15, 2009, 10 pages.

D.-Y. Chen et al., "On Visual Similarity Based 3D Model Retrieval," Computer Graphics Forum, vol. 22, No. 3, Sep. 2003, pp. 223-232.

A. E. Johnson et al., "Using Spin Images for Efficient Object Recognition in Cluttered 3D Scenes," IEEE Transactions on Pattern Analysis and Machine Intelligence, vol. 21, No. 5, May 1999, pp. 433-449.

H. Ling et al., "Shape Classification Using the Inner-Distance," IEEE Transactions on Pattern Analysis and Machine Intelligence, Jan. 2007, 35 pages.

R. B. Rusu et al., "Fast Point Feature Histograms (FPFH) for 3D Registration," IEEE International Conference on Robotics and Automation, May 2009, 6 pages.

R. B. Rusu et al., "Aligning Point Cloud Views using Persistent Feature Histograms," IEEE/RSJ International Conference on Intelligent Robots and Systems, Sep. 2008, 8 pages.

D. Maturana et al., "VoxNet: A 3D Convolutional Neural Network for Real-Time Object Recognition," IEEE/RSJ International Conference on Intelligent Robots and Systems, Oct. 2015, 7 pages.

C. R. Qi et al., "Volumetric and Multi-View CNNs for Object Classification on 3D Data," arXiv: 1604.03265v2, Apr. 29, 2016, 14 pages.

Z. Wu et al., "3D ShapeNets: A Deep Representation for Volumetric Shapes," arXiv: 1406.5670v3, Apr. 15, 2015, 9 pages.

Y. Li et al., "FPNN: Field Probing Neural Networks for 3D Data," arXiv:1605.06240v3, Oct. 25, 2016, 10 pages.

D. Z. Wang et al., "Voting for Voting in Online Point Cloud Object Detection," Robotics: Science and Systems, vol. 1, No. 3, Jul. 2015, 9 pages.

H. Su et al., "Multi-view Convolutional Neural Networks for 3D Shape Recognition," arXiv:1505.00880v3, Sep. 27, 2015, 12 pages.

Y. Fang et al., "3D Deep Shape Descriptor," IEEE Conference on Computer Vision and Pattern Recognition, Jun. 2015, pp. 2319-2328.

K. Guo et al., "3D Mesh Labeling via Deep Convolutional Neural Networks," ACM Transactions on Graphics, vol. 35, No. 1, Dec. 2015, pp. 3:1-3:12.

N. Guan et al., "MahNMF: Manhattan Non-negative Matrix Factorization," arXiv:1207.3438v1, Jul. 14, 2012, 43 pages.

Z. Geng et al., "Is Attention Better Than Matrix Decomposition?" arXiv:2109.04553v2, Dec. 28, 2021, 24 pages.

G. Gafni et al., "Dynamic Neural Radiance Fields for Monocular 4D Facial Avatar Reconstruction," IEEE/CVF Conf. on Computer Vision and Pattern Recognition, Jun. 2021, pp. 8649-8658.

B. Gecer et al., "Synthesizing Coupled 3D Face Modalities by Trunk-Branch Generative Adversarial Networks," arXiv:1909.02215v3, Dec. 2, 2020, 19 pages.

W. Sun et al., "Canonical Capsules: Self-Supervised Capsules in Canonical Pose," arXiv:2012.04718v2, Nov. 24, 2021, 16 pages.

T. Deprelle et al., "Learning Elementary Structures for 3d Shape Generation and Matching," arXiv:1908.04725v2, Aug. 14, 2019, 11 pages.

Y. Zhao et al., "3D Point Capsule Networks," arXiv:1812.10775v2, Jul. 11, 2019, 14 pages.

E. Creager et al., "Environment Inference for Invariant Learning," arXiv:2010.07249v5, Jul. 15, 2021, 23 pages.

* cited by examiner

METHOD, ELECTRONIC DEVICE, AND COMPUTER PROGRAM PRODUCT FOR MODEL PROCESSING

RELATED APPLICATION

The present application claims priority to Chinese Patent Application No. 202310077123.4, filed Jan. 16, 2023, and entitled "Method, Electronic Device, and Computer Program Product for Model Processing," which is incorporated by reference herein in its entirety.

FIELD

Embodiments of the present disclosure relate to the field of model processing, and more particularly, to a method, an electronic device, and a computer program product for model processing.

BACKGROUND

Along with rapid development of three-dimensional (3D) scenario application technology, point cloud model-based processing technology has attracted more and more attention in fields such as artificial intelligence, big data, cloud service, and mobile terminals, and has been widely applied. For example, point cloud model-based processing technology can be applied in contexts such as 3D scanners, light detection and ranging (LIDAR) systems, and depth cameras, providing significant advantages for fields such as automatic driving technology and character virtual expression capturing technology.

SUMMARY

Embodiments of the present disclosure relate to a method, an electronic device, and a computer program product for point cloud model processing.

According to a first aspect of the present disclosure, a method is provided. The method includes encoding first data of a point cloud model to obtain a first matrix; encoding second data of the point cloud model to obtain a second matrix, wherein the first data and the second data are data of the point cloud model acquired from different angles; respectively decomposing, by an equivariant encoder, the first matrix and the second matrix into a first equivariant matrix and a second equivariant matrix, wherein the equivariant encoder is configured to encode data inside the point cloud model; respectively decomposing, by an invariant encoder, the first matrix and the second matrix into a first invariant matrix and a second invariant matrix, wherein the invariant encoder is configured to encode data of the point cloud model relative to a physical space; and training the equivariant encoder and the invariant encoder based on the first equivariant matrix, the second equivariant matrix, the first invariant matrix, and the second invariant matrix.

According to a second aspect of the present disclosure, an electronic device is provided, including: at least one processor; and a memory coupled to the at least one processor and having instructions stored therein, where the instructions, when executed by the at least one processor, cause the electronic device to perform actions including: encoding first data of a point cloud model to obtain a first matrix; encoding second data of the point cloud model to obtain a second matrix, wherein the first data and the second data are data of the point cloud model acquired from different angles; respectively decomposing, by an equivariant encoder, the first matrix and the second matrix into a first equivariant matrix and a second equivariant matrix, wherein the equivariant encoder is configured to encode data inside the point cloud model; respectively decomposing, by an invariant encoder, the first matrix and the second matrix into a first invariant matrix and a second invariant matrix, wherein the invariant encoder is configured to encode data of the point cloud model relative to a physical space; and training the equivariant encoder and the invariant encoder based on the first equivariant matrix, the second equivariant matrix, the first invariant matrix, and the second invariant matrix.

According to a third aspect of the present disclosure, a computer program product is provided. The computer program product is tangibly stored on a non-transitory computer-readable medium and includes machine-executable instructions, where the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
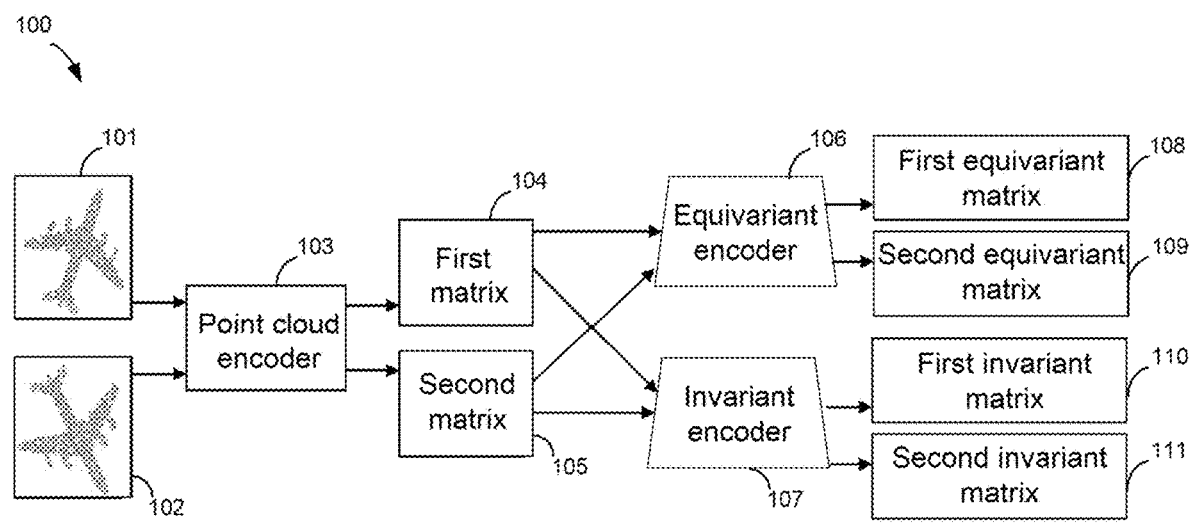
FIG. 1 illustrates a schematic diagram in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Understanding the accurate meaning of each element or object in a 3D model including a point cloud model is one of the core problems in computer visualization, particularly, in the process of performing 3D modeling and capturing on a character portrait so as to generate elements or objects of the face, such as eyes, eyebrows, and mouth, learning representations with the elements or objects in the 3D model as the center is very important in a plurality of downstream tasks.

However, in the process of optimizing the generated 3D model through a machine learning method, although subtle changes of the elements in the 3D model may have great influence on marking and identification of the elements or objects in the model, for example, when an open mouth becomes closed, a flat brow becomes wrinkled, or blinking is excessive, the machine learning model may not accurately mark elements generated by a certain angle change or position change, thus greatly reducing the accuracy of the generated 3D model. This brings a great challenge to the point-cloud-based 3D modeling technology since the point-cloud-based 3D modeling technology may vary according to different conditions.

In addition, in machine learning, a conventional convolutional architecture needs a highly regular input data format, such as an image mesh or 3D voxel format, so as to perform weight sharing and other core optimization. Since point cloud data or gridded data is not in a highly regular conventional format, most researchers usually need to transform irregular data such as the point cloud data into a conventional 3D voxel mesh or image set (e.g., a view) which is then supplied to a deep network architecture. Due to the data transformation, the generated data is excessively redundant, and meanwhile, quantization artifacts that can mask the data natural invariance may be introduced.

At present, there are many 3D feature object learning methods, such as volume CNN, which utilizes a 3D convolutional neural network for processing voxelized shapes. However, data sparsity and computing cost of the 3D convolution naturally limit capabilities of representations learned from the networks. A plurality of metrics are provided in technologies such as FPNN and Vote3D to solve the problem of data sparsity, but when these methods are involved in many point clouds, they are limited by their space-volume-based operations. Thus, the ability to extract the representativeness of feature objects is still one of the key constraints that limit these metrics.

Current point cloud feature extraction algorithms are more manually adjusted based on one or more specific tasks. These features include some statistical attributes which are invariable for some transformations. Thus, the features may be divided into interiors (local features) and exteriors (global features). However, it is also necessary to combine the attributes in an optimal manner, but it is not easy to make the whole optimization process clear and efficient.

At least to address the above and other potential problems, embodiments of the present disclosure provide a method for image processing. The method includes encoding first data of a point cloud model to obtain a first matrix; and encoding second data of the point cloud model to obtain a second matrix, wherein the first data and the second data are data of the point cloud model acquired from different angles. The method further includes respectively decomposing, by an equivariant encoder, the first matrix and the second matrix into a first equivariant matrix and a second equivariant matrix, where the equivariant encoder is configured to encode data inside the point cloud model; and respectively decomposing, by an invariant encoder, the first matrix and the second matrix into a first invariant matrix and a second invariant matrix, where the invariant encoder is configured to encode data of the point cloud model relative to a physical space. The method further includes training the equivariant encoder and the invariant encoder based on the first equivariant matrix, the second equivariant matrix, the first invariant matrix, and the second invariant matrix. By adopting the method, more beneficial data representations in point cloud data can be learned in an efficient, rapid, non-parametric, and unsupervised mode, and a point cloud model is reconstructed based on the learned data representations.

Basic principles and several example embodiments of the present disclosure will be described in detail below with reference to the accompanying drawings. FIG. 1 illustrates schematic diagram 100 in which a device and/or a method according to embodiments of the present disclosure can be implemented. It should be understood that the numbers and arrangement of components, elements, and models illustrated in FIG. 1 are examples only, and different numbers and different arrangements of components, elements, and models can be included in schematic diagram 100.

FIG. 1 illustrates schematic diagram 100 including first data 101 and second data 102 of a point cloud model, point cloud encoder 103, first matrix 104, second matrix 105, equivariant encoder 106, invariant encoder 107, first equivariant matrix 108, second equivariant matrix 109, first invariant matrix 110, and second invariant matrix 111.

In FIG. 1, first data 101 of the point cloud model and second data 102 of the point cloud model are data sets of any object or entity subjected to 3D scanning. As an example, first data 101 and second data 102 of the point cloud model in the present disclosure may be data sets of the same airplane subjected to 3D scanning. Second data 102 may be obtained after scanning at an angle different from the scanning angle of first data 101. For example, second data 102 of the point cloud model is acquired by scanning the same airplane from a second scanning point at an arbitrary angle such as 45 degrees or 90 degrees relative to the first scanning point at which first data 101 is scanned.

It should be understood that although first data 101 and second data 102 are shown as an airplane model in FIG. 1, it is only an example, rather than a specific limitation to the present disclosure. According to the practical application situation, first data 101 and second data 102 may be data sets for an object or entity of any type and any size, such as a data set obtained through 3D scanning of the head or trunk of a character or an animal or a data set obtained through 3D scanning of a road facility, which is not limited by the present disclosure.

First data 101 and second data 102 may be defined by the following formula:

$$P = \{P_n \mid n = 1, \ldots, N\} \quad (1)$$

where each element $P_n$ in first data 101 and second data 102 includes its (x, y, z) coordinates and vectors of additional feature channels (colors, normals, etc.). In the present disclosure, for simplicity and example, only (x, y, z) coordinates are used unless otherwise noted.

First data 101 and second data 102 are subsets from points in a Euclidean space, which have three main characteristics:
(1) Data randomness, where unlike regular pixel arrays in an image or regular voxel arrays in a volume mesh, the data is an irregular arrangement of data.
(2) Interaction between data elements, where the elements come from a space with a distance metric. This means that the elements are not isolated, and adjacent elements may form a meaningful subset. Thus, it is necessary to be able to capture the interaction between local structures from nearby points in the data.
(3) Invariance under transformation, where, as geometric objects, some element set representations in first data 101 and second data 102 should be invariant with respect to some transformations. For example, after the point cloud model is rotated and translated, a global point cloud category or point division in the point cloud model should not be changed.

In FIG. 1, after first data 101 and second data 102 are encoded by point cloud encoder 103, first matrix 104 corresponding to features of first data 101 and second matrix 105 corresponding to features of second data 102 can be respectively acquired. As an example, features of the point cloud model may include, but are not limited to, point three-dimensional coordinates, normal, principal curvature, intensity gradient, difference in elevation, echo intensity, etc. of the point cloud model, which are not limited by the present disclosure.

Point cloud encoder 103 may be any trained deep learning model which can encode the point cloud model and include, but is not limited to, a multi-layer perceptron (MLP), a recurrent neural network model, a recursive neural network model, a deep convolutional network model (CNN), a deep generative model (DNN), a generative adversarial network model (GAN), etc., which is not limited by the present disclosure. In the present disclosure, as an example, point cloud encoder 103 may be a trained MLP-based deep learning model with the model encoding capability.

First matrix 104 and second matrix 105 can be later respectively fed into equivariant encoder 106 and invariant encoder 107. Equivariant encoder 106 may perform matrix decomposition on first matrix 104 and second matrix 105 so as to further generate first equivariant matrix 108 and second equivariant matrix 109, where first equivariant matrix 108 corresponds to related information of local features of first data 101, and second equivariant matrix 109 corresponds to related information of local features of second data 102.

Correspondingly, invariant encoder 107 may perform matrix decomposition on first matrix 104 and second matrix 105 so as to further generate first invariant matrix 110 and second invariant matrix 111, where first invariant matrix 110 corresponds to related information of global features of first data 101, and second invariant matrix 111 corresponds to related information of global features of second data 102.

In the present disclosure, equivariant encoder 106 may be configured to extract and encode the related information of the local features in first data 101 and second data 102. The local features of the point cloud model may include a correlation between one element in the point cloud model and one or more other elements, such as a position and an angle of one element relative to another element.

For example, in the context with an airplane point cloud model as an example, equivariant encoder 106 can extract and encode local information and features such as shapes, sizes, and names of components of the airplane, the space between the wings, sizes and shapes of airplane windows, the wing's rotation angles, and a position of the airplane engine relative to the whole airplane body.

In another embodiment, in the context with a point cloud model of the head of a person as an example, equivariant encoder 106 can extract and encode information such as the distance between pupils of the person, a mouth curving angle, the distance between eyebrows and eyes, the shape of the tip of the nose, the height, width, and length of the ridge of the nose, the type of columella of the nose, the length of beards, the lip type, the depth of five sensor organs, and the length, width, size and shape of the eyes. It should be understood that the above local information encoded by equivariant encoder 106 is for illustrative purposes only, and is not intended to limit the scope of protection of the present disclosure. Equivariant encoder 106 can encode related information of any local feature in the point cloud model.

In the present disclosure, invariant encoder 107 may be configured to extract and encode the related information of the global features in first data 101 and second data 102. The global features of the point cloud model may include a correlation between the elements in the point cloud model and an external physical space, such as a position, an angle, and an orientation of one element relative to the physical space.

For example, in the context with the airplane point cloud model as an example, invariant encoder 107 can encode global information and features such as an orientation, length, and overall outline of the airplane, the airplane color, and an absolute position of the airplane relative to the physical space.

In another embodiment, in the context with a point cloud model of the head of a person as an example, invariant encoder 107 can extract and encode global information of the person such as face shape and length, head orientation, head contour, head size, side face ratio, angle, texture, skin quality, etc. It should be understood that the above global information recorded by invariant encoder 107 is for illustrative purposes only, and is not intended to limit the scope of protection of the present disclosure. Invariant encoder 107 can encode related information of any global feature in the point cloud model.

Decomposition of first matrix 104 and second matrix 105 by equivariant encoder 106 and invariant encoder 107 described above may be defined by the following formula:

$$X = UV + E \quad (2)$$

where $X \in R^{M \times d}$ represents first matrix 104 and second matrix 105, $U \in R^{M \times k}$ represents first equivariant matrix 108 and second equivariant matrix 109, $V \in R^{k \times d}$ represents first invariant matrix 110 and second invariant matrix 111, M represents the number of elements in first matrix 104 and second matrix 105, k<d represents a decomposition factor, and E represents a remainder after decomposition.

The matrix V may be considered as an activating factor, which is invariable and is the most important information for dataset capturing. The matrix U may be considered as a template factor, which is equivariant for each input data sample. Thus, UV is low-rank approximation of X. Thus, the method may be regarded as white box unsupervised decomposition, which utilizes a low-rank character of a feature matrix. The specific matrix decomposition method may include, but is not limited to, Singular Value Decomposition (SVD). It should be understood that the matrix decomposition method in the present disclosure is for illustrative purposes only, and is not intended to limit the scope of protection of the present disclosure. The matrix decomposition method may include any known technology.

Low-rank hypothesis is helpful to the global context of modeling since it represents inductive biases, that is, high-level concepts included in a low-level representation are limited, and are much less than the representation per se in scale. Imagine a picture of a person walking on a road. The road will be described by many superpixels extracted from the main CNN. The road may be regarded as duplications of small road pieces, which means that the road can be represented by modeling and duplicating the basic road pieces. In mathematics, it is equivalent to finding a small group of basis-D and coefficient matrix C corresponding to different road pieces, and the coefficient matrix captures a relation between the basic road pieces and the superpixels. This example illustrates that a high-level concept (i.e., global context) can be low level in an ideal situation. The superpixels describing the road pieces have close semantic attributes. However, since a CNN model is low in long-distance dependence modeling efficiency, the learned representation includes excessive local details and incorrect information, which lacks global instructions. For example, if the person in the picture wears gloves, when a glove piece is seen locally, it is considered that the piece describes the gloves; and when the global context is considered, it can be understood that the block is a part of the person. The semantic information is hierarchical, depending on which level you want to understand it. The work is intended to make a network understand the global context through a low-rank recovery formula. Thus, the incorrect information (i.e., redundancy and incompleteness) is modeled as a noise matrix. To emphasize the global context, the representation is decomposed into two parts: a low-rank global information matrix and a local equivariant matrix; and an optimization algorithm is adopted to recover a clean signal subspace and abandon noise, and skip connections are adopted. Thus, the amount of global information needed by the network for a specific task can be known from the data.

It should be understood that the method described above for performing matrix decomposition on the point cloud model is for illustrative purposes only, and is not intended to limit the scope of the present disclosure. Any proper method can be used for performing matrix decomposition on the point cloud model.

The method for performing matrix decomposition on the point cloud model is described above in combination with the trained equivariant encoder and invariant encoder in the present disclosure. However, the current known equivariant encoder and invariant encoder cannot accurately perform matrix decomposition on the point cloud model. Thus, the equivariant encoder and the invariant encoder are pre-trained so as to implement the method described in the present disclosure. Process 200 for pre-training an equivariant encoder and an invariant encoder is described below in combination with FIG. 2.

Figure 2:
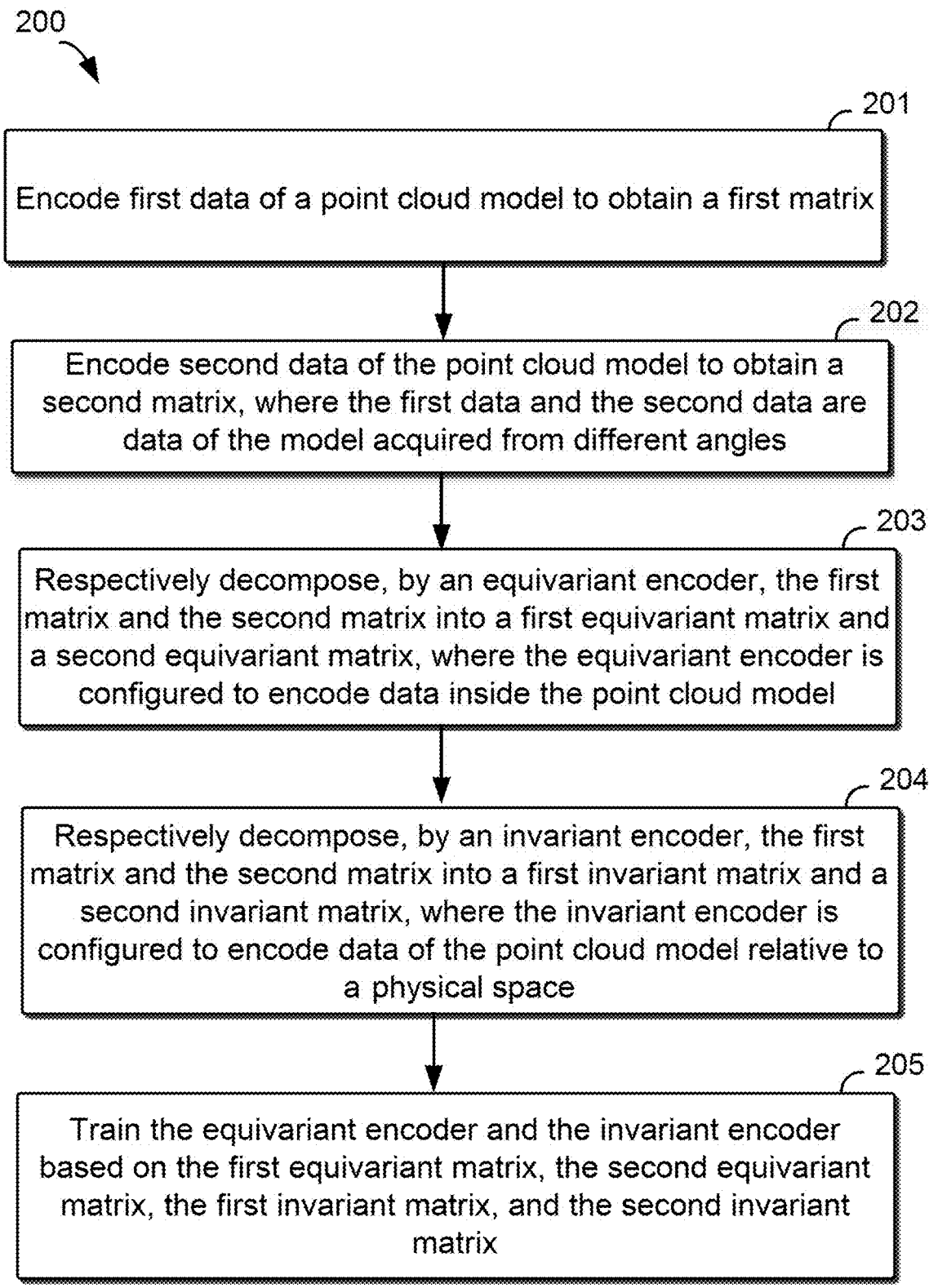
FIG. 2 illustrates a flow chart of a method for model processing according to an embodiment of the present disclosure.

As shown in FIG. 2, at block 201, point cloud encoder 103 encodes first data 101 of a point cloud model so as to obtain first matrix 104. First data 101 of the point cloud model may be a data set of any point cloud model subjected to 3D scanning, and may include various kinds of feature information of the point cloud model, such as local feature information about the correlation between various elements in the point cloud model, and global feature information about the correlation between the point cloud model and an external physical space. Point cloud encoder 103 can encode the information into first matrix 104.

At block 202, point cloud encoder 103 encodes second data 102 of the point cloud model so as to obtain second matrix 105. Second data 102 of the point cloud model may be a data set of any point cloud model subjected to 3D scanning. Second data 102 of the point cloud model is different from first data 101 of the point cloud model in that the second data of the point cloud model is obtained through any transformation of the same point cloud model, such as rotation at any angle or enlargement or reduction adjustment at any scale. The second data of the point cloud model may include various kinds of feature information of the point cloud model, such as local feature information about the correlation between various elements in the point cloud model, and global feature information about the correlation between the point cloud model and an external physical space. Point cloud encoder 103 can encode the information into second matrix 105.

At block 203, equivariant encoder 106 respectively decomposes first matrix 104 and second matrix 105 into first equivariant matrix 108 and second equivariant matrix 109. Equivariant encoder 106 mainly encodes the local feature information and data between the elements in the point cloud model above, and respectively encodes the local feature information into first equivariant matrix 108 and second equivariant matrix 109. The local feature information and data can be used for representing the correlation between various elements in the point cloud model. Thus, first equivariant matrix 108 and second equivariant matrix 109 can represent relative positions between the data in the point cloud model.

At block 204, invariant encoder 107 respectively decomposes the first matrix and the second matrix into first invariant matrix 110 and second invariant matrix 111. Invariant encoder 107 mainly encodes the global feature information and data in the point cloud model above, and respectively encodes the global feature information into first invariant matrix 110 and second invariant matrix 111. The global feature information and data can be used for representing the correlation of the point cloud model relative to the physical space. Thus, the first invariant matrix and the second invariant matrix can represent an absolute position of the point cloud model relative to the physical space.

At block 205, equivariant encoder 106 can be trained based on first equivariant matrix 108 and second equivariant matrix 109, and invariant encoder 107 can be trained based on first invariant matrix 110 and second invariant matrix 111. By adopting the method, more beneficial data representations in point cloud data can be learned in an efficient, rapid, and non-parametric mode, and a point cloud model is reconstructed based on the learned data representations. The present disclosure designs a novel matrix decomposition-based invariant (MDI) learning framework, which can provide a uniform system architecture for unsupervised invariant point set feature learning. The invariant (MDI) learning framework performs well in aspects of point cloud reconstruction and unsupervised classification. In addition, embodiments of the present disclosure are beneficial to other downstream tasks, such as collaborative computing in portrait generation.

As an example, invariant encoder 107 can be trained by making the similarity between first invariant matrix 110 and second invariant matrix 111 generated by invariant encoder 107 close, which can be represented by the following formula:

$$L_{sim} = \|V_1 - V_2\|_F \qquad (3)$$

where $V_1$ and $V_2$ represent first invariant matrix 110 and second invariant matrix 111 respectively. The Frobenius norm between $V_1$ and $V_2$ is calculated, and if the norm of a difference between $V_1$ and $V_2$ generated by invariant encoder 107 becomes larger and larger, it indicates that this is opposite to the direction in which invariant encoder 107 is to be trained; and on the contrary, if the norm of the difference between $V_1$ and $V_2$ generated by invariant encoder 107 becomes smaller and smaller, it indicates that this is the direction in which invariant encoder 107 is to be trained. Invariant encoder 107 can be trained in this manner, and the final training target is to make $V_1$ and $V_2$ consistent, that is, the Frobenius norm between $V_1$ and $V_2$ is zero.

As an example, equivariant encoder 106 can be trained by making the similarity between first equivariant matrix 108 and second equivariant matrix 109 generated by equivariant encoder 106 meet a similarity threshold, which can be represented by the following formula:

$$L_{spa}(P) = tr(U^T W U) \qquad (4)$$

This formula represents that first equivariant matrix 108 can be subjected to certain linear transformation into second equivariant matrix 109, and as an example, linear transformation in the present disclosure may be a transposition operation on the equivariant matrices. In some embodiments, U represents one or more matrices in first equivariant matrix 108 and second equivariant matrix 109, tr(•) represents the trace of the matrices, W is a weight between corresponding elements or points between first equivariant matrix 108 and second equivariant matrix 109, and W can be represented by the following formula:

$$W(m, n) = \exp\left(\frac{\|P_m - P_n\|_2^2}{\sigma^2}\right) \qquad (5)$$

where $P_m$ and $P_n$ represent elements in first equivariant matrix 108 and second equivariant matrix 109 respectively, and $\sigma$ represents a parameter for controlling the distance between first equivariant matrix 108 and second equivariant matrix 109.

Through the above formula, the elements in first equivariant matrix 108 generated by equivariant encoder 106 can be subjected to linear transformation to correspond to the elements in second equivariant matrix 109. When the similarity between first equivariant matrix 108 and second equivariant matrix 109 conforms to the similarity threshold, it can be considered that equivariant encoder 106 is completely trained.

Measurement of the similarity may include, but is not limited to, whether a Chamfer distance between elements in first equivariant matrix 108 and elements in second equivariant matrix 109 conforms to a preset threshold, whether the elements in first equivariant matrix 108 are in one-to-one correspondence with the elements in second equivariant matrix 109, whether the elements in first equivariant matrix 108 are close enough in distance to the elements in second equivariant matrix 109, etc. The similarity threshold may be a value preset by a user.

For example, when, after linear transformation, 90% of the elements in first equivariant matrix 108 generated by equivariant encoder 106 can correspond to the elements in second equivariant matrix 109, it can be considered that equivariant encoder 106 is completely trained. Additionally or alternatively, the similarity threshold may be set as any value, which is not limited by the present disclosure.

Figure 3:
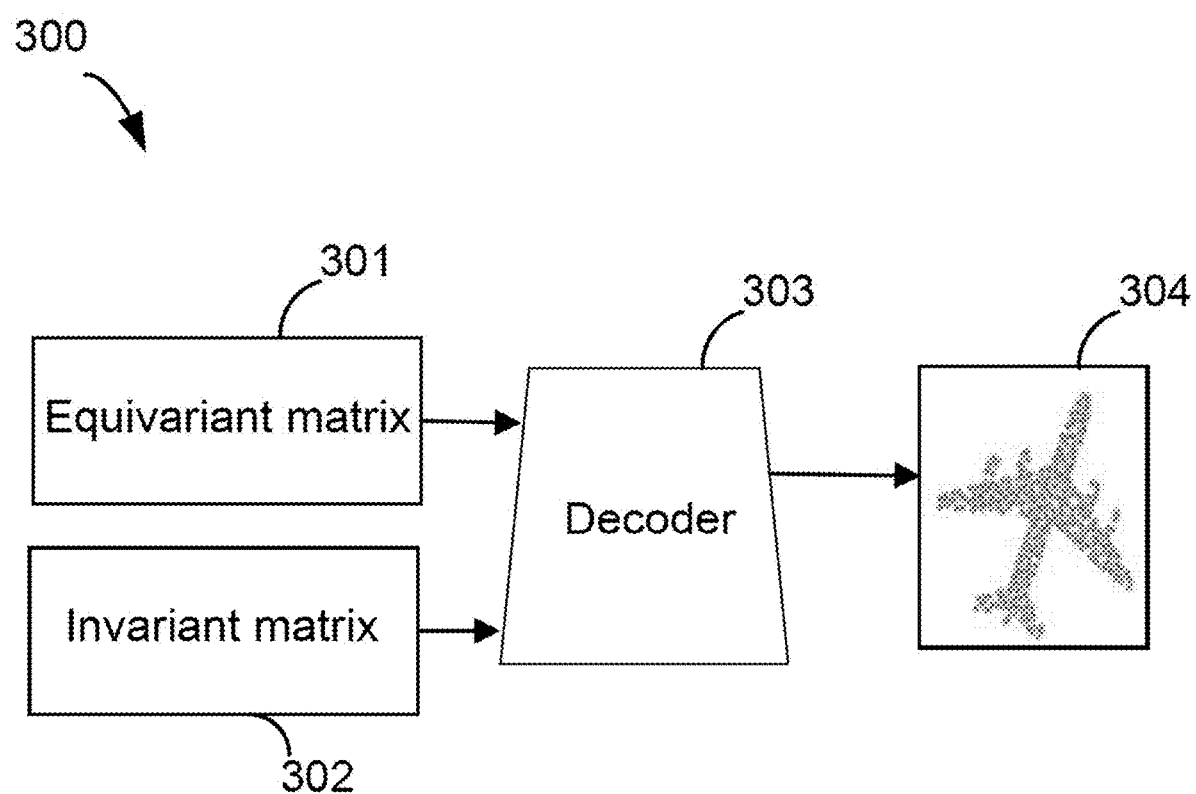
FIG. 3 illustrates a schematic diagram of training a decoder together with an equivariant encoder and an invariant encoder so as to optimize a reconstructed point cloud model according to an embodiment of the present disclosure.

FIG. 3 illustrates schematic diagram 300 of training decoder 303 together with equivariant encoder 106 and invariant encoder 107 so as to optimize a reconstructed point cloud model.

As shown in FIG. 3, components and elements for reconstructing a point cloud model may include, but are not limited to, equivariant matrix 301, invariant matrix 302, decoder 303, and reconstructed point cloud model 304.

Equivariant matrix 301 is from one or more of matrices in first equivariant matrix 108 and second equivariant matrix 109 generated by equivariant encoder 106 in FIG. 1. Invariant matrix 302 is from one or more of matrices in first invariant matrix 110 and second invariant matrix 111 generated by invariant encoder 107 in FIG. 1.

Decoder 303 may be any trained deep learning model which can decode the point cloud model data and include, but is not limited to, a multi-layer perceptron (MLP), a recurrent neural network model, a recursive neural network model, a deep convolutional network model (CNN), a deep generative model (DNN), a generative adversarial network model (GAN), etc., which is not limited by the present disclosure.

Equivariant matrix 301 and invariant matrix 302 may be fed into decoder 303 so as to generate reconstructed point cloud model 304. Then, a similarity between reconstructed point cloud model 304 and an original point cloud model of first data 101, second data 102, etc. can be compared.

Measurement of the similarity may include, but is not limited to, whether a chamfer distance between elements in reconstructed point cloud model 304 and elements in the original point cloud model conforms to a preset threshold, whether an outline of reconstructed point cloud model 304 is similar enough to an outline of the original point cloud model, whether the elements of reconstructed point cloud model 304 are in one-to-one correspondence with the elements of the original point cloud model, and whether the corresponding elements between reconstructed point cloud model 304 and the original point cloud model are close enough in distance, which is not limited by the present disclosure.

If the similarity between reconstructed point cloud model 304 and the original point cloud model falls within the similarity threshold, the training of decoder 303, equivariant encoder 106, invariant encoder 107, and other components can be stopped. The similarity threshold may be a value preset by the user.

For example, when the similarity between reconstructed point cloud model 304 generated by decoder 303 and the original point cloud model is 80%, it can be considered correspondingly that the training of decoder 303 has been completed. Additionally or alternatively, the similarity threshold may be set as any value, which is not limited by the present disclosure.

If the similarity between reconstructed point cloud model 304 and the original point cloud model does not fall within the similarity threshold, the training of decoder 303 and other components can be continued, which can be defined by the following formula:

$$L_{dec} = \frac{1}{N} \|P - \hat{P}\|_F \tag{6}$$

where P represents an element in the original point cloud model, and $\hat{P}$ represents an element in reconstructed point cloud model 304 generated by decoder 303. Reconstructed point cloud model 304 generated by decoder 303 is made close to the original point cloud model by minimizing the Frobenius norm between the elements in the original point cloud model and the elements in reconstructed point cloud model 304.

When decoder 303, equivariant encoder 106, and invariant encoder 107 are trained together, the process of making reconstructed point cloud model 304 generated by decoder 303 close to the original point cloud model may be defined by the following formula:

$$L = L_{sim} + \alpha \sum_{i=1}^{2} L_{spa}^{i} + \beta \sum_{i=1}^{2} L_{dec}^{i} \tag{7}$$

where α and β are weights of a control function. Additionally or alternatively, decoder 303 may also be independently trained.

The process of training decoder 303 together with equivariant encoder 106 and invariant encoder 107 may be described by the following process. Input being $\{P\} \in \mathcal{P}$ is a data set from the point cloud model, weights are α and β, and the training iteration number is T; and according to output, in the encoder and the decoder, for t=1 to T, each minimum batch B, and each object, an input point generated by two random transformations is calculated in random, a loss in the formula (7) is calculated, the sum of all objects is calculated, and back propagation is used for updating parameters.

Figure 4:
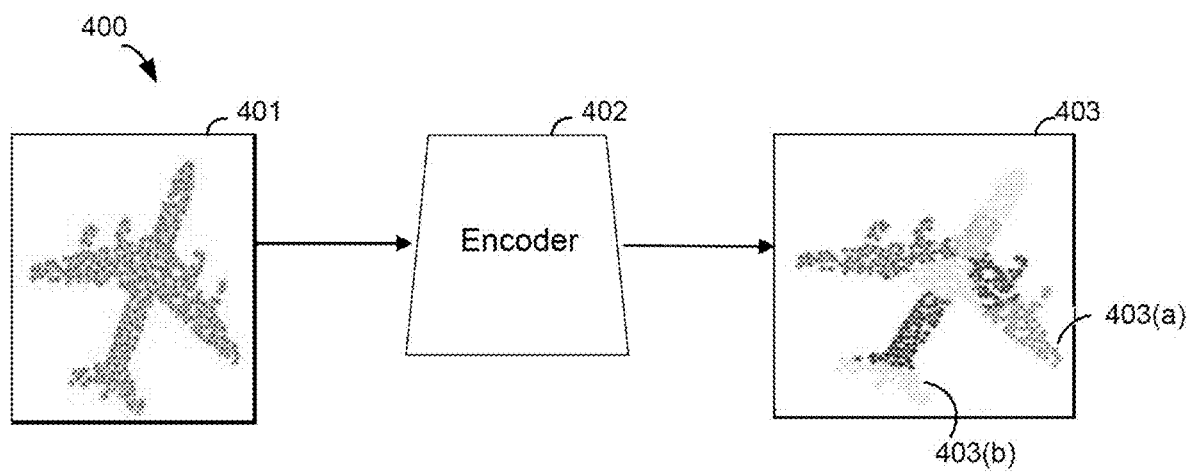
FIG. 4 illustrates a schematic diagram of various operations on a point cloud model using a trained encoder.

FIG. 4 illustrates schematic diagram 400 of various operations on point cloud model 401 using trained equivariant encoder 106.

As shown in FIG. 4, trained encoder 402 may include, but is not limited to, previously-described trained point cloud encoder 103, trained equivariant encoder 106, and trained invariant encoder 107. Point cloud encoder 103 in trained encoder 402 can encode point cloud model 401, so as to generate a feature matrix.

Then, the feature matrix can be fed into trained equivariant encoder 106. Trained equivariant encoder 106 can decompose the feature matrix into one or more equivariant matrices. Then, trained equivariant encoder 106 can divide the one or more equivariant matrices and identify them as one or more parts based on learned priori knowledge, and these divisions are semantic divisions. For example, the one or more parts may be embodied, in point cloud model 403, as model elements such as wing 403(a) and empennage 403(b). As mentioned earlier, the priori knowledge may include the local information and features learned during previous training of equivariant encoder 106, such as the shapes, sizes, and names of components of the airplane, the space between the wings, the sizes and shapes of airplane windows, the wing's rotation angles, and the position of the airplane engine relative to the whole airplane body.

The feature matrix may also be fed into trained invariant encoder 107 and can be decomposed by trained invariant encoder 107 into one or more invariant matrices. Then, trained invariant encoder 107 can classify the one or more invariant matrices based on the learned priori knowledge. For example, invariant encoder 107 can classify point cloud model 401 as an airplane, a human being, an animal, etc. according to different appearances of point cloud model 401. As mentioned earlier, the priori knowledge may include the global information and the features such as the orientation, length, and overall outline of the airplane, the airplane color, and the absolute position of the airplane relative to the physical space.

Additionally or alternatively, trained encoder 402 may also perform operations such as color replacement and feature adding on point cloud model 401, and the operations are for illustrative purposes only, rather than a specific limitation to the present disclosure. The operations on trained encoder 402 are not limited by the present disclosure.

Figure 5:
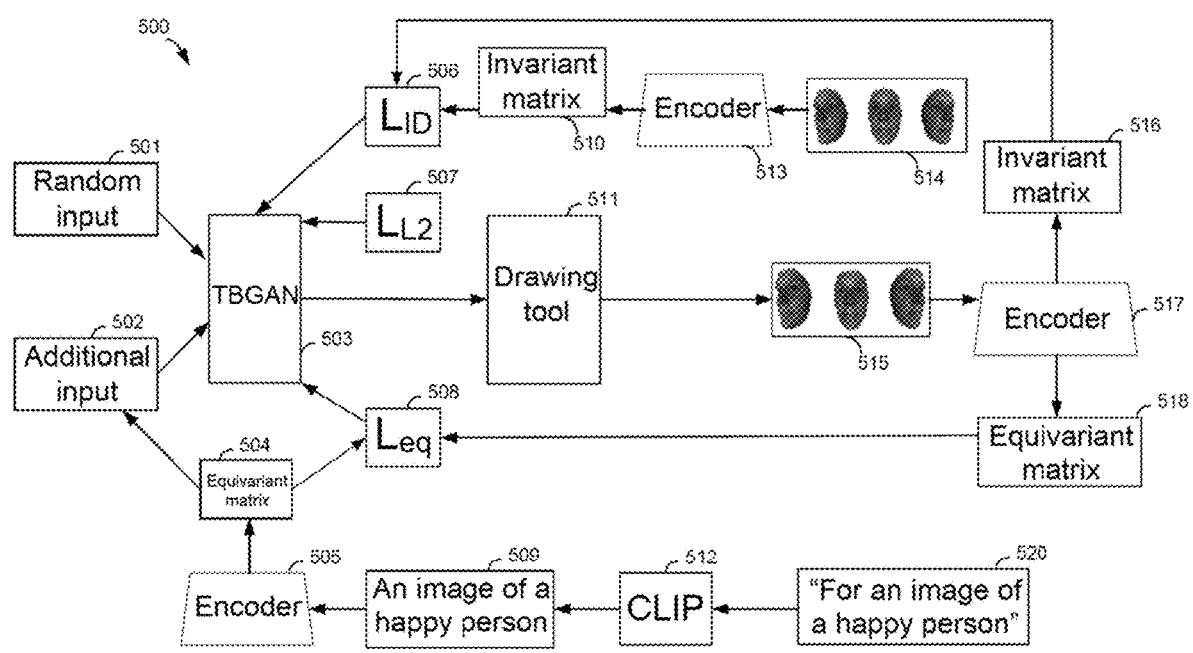
FIG. 5 illustrates an example diagram of generating a portrait of a virtual character using a trained encoder.

FIG. 5 illustrates schematic diagram 500 of generating a character portrait using a trained encoder. In FIG. 5, text 520 of "for an image of a happy person" can be firstly fed into Contrastive Language-Image Pre-training (CLIP)-based deep learning model 512 with the text and image processing capability. CLIP-based deep learning model 512 can utilize a large number of image and text pairs from the Internet for training and matching and performing noise comparison and estimation, where image and text pairs from the same sample are used as positive examples, and other samples in the same batch are regarded as negative examples, so as to generate images corresponding to the text.

In response to receiving text 520 of "for an image of a happy person," CLIP-based deep learning model 512 can generate image 509 corresponding to the happy person. Then, image 509 can be fed into encoder 505. Encoder 505 in the present disclosure is an encoder obtained through training according to the method described in FIG. 2, and may include elements such as an equivariant encoder and an invariant encoder, which is not limited by the present disclosure. Additionally or alternatively, encoder 513 and encoder 517 may be encoders identical to encoder 505, and also have the elements such as the equivariant encoder and the invariant encoder, which is not limited by the present disclosure.

Encoder 505 can decompose image 509 into equivariant matrix 504, so as to extract global information and features in the image, such as a portrait outline and a shape.

Equivariant matrix 504 may serve as additional input 502 and random input 501 to be later fed into a pre-trained Trunk-Branch Generative Adversarial Network (TBGAN). TBGAN model $\mathcal{G}$ 503 is a mature technology capable of generating realistic 3D faces with texture and geometric coupling, which is widely applied to generation of virtual portraits. Random input 501 $z$ 531 $\mathcal{R}^d$ may include d-dimensional random input vectors sampled from Gaussian distribution $\mathcal{N}(0,\sigma^2)$. TBGAN model $\mathcal{G}$ 503 performs partial forward propagation on additional input 502 and random input 501 so as to obtain an interlayer vector $c \in \mathcal{C}$.

Optimization of the interlayer vector $c \in \mathcal{C}$ may include generating a texture mesh first using the generated shape, normal, and texture UV maps through cylindrical projection. Then, under a prompt t of the given text "a happy person," a direction $\Delta c$ is found through gradient descent optimization of c, where $\mathcal{G}(c+\Delta c)$ generates a controllable texture mesh, a target attribute assigned by t exists or is enhanced in the texture mesh while other attributes are basically kept unchanged. Thus, an original intermediate implicit vector c is optimized through gradient descent, and work is performed in a 4×4 dense layer s of the TBGAN model.

The optimized implicit vector c+Δc may be then fed into drawing tool 511 associated with TBGAN model $\mathcal{G}$ 503 to generate shape, normal, and texture UV maps, and finally, operable edited portrait 515 with the target attribute is generated. To perform meaningful operations on edited portrait 515 without generating artifacts or changing irrelevant attributes, a combination of an equivariant loss $\mathcal{L}_{eq}$ 508, an identity loss $\mathcal{L}_{ID}$ 506, and an L2 loss $\mathcal{L}_{L2}$ 507 is adopted and shown below:

$$\arg\min_{\Delta c \in C} \mathcal{L}_{eq} + \lambda_{ID}\mathcal{L}_{ID} + \lambda_{L2}\mathcal{L}_{L2} \qquad (8)$$

where $\lambda_{ID}$ and $\lambda_{L2}$ are hyperparameters of $\mathcal{L}_{ID}$ and $\mathcal{L}_{L2}$ respectively. The equivariant loss $\mathcal{L}_{eq}$ 508 may be used for ensuring existence or enhancement of an attribute assigned by a user, such as character expression and other detailed local information. But $\mathcal{L}_{ID}$ 506 and $\mathcal{L}_{L2}$ 507 keep other attributes unchanged, such as face outline and other global information.

The identity loss $\mathcal{L}_{ID}$ 506 can minimize the distance between the identities of original portrait 514 and edited portrait 515, and may be represented by the following formula:

$$\mathcal{L}_{ID} = \|V_{ori} - V_{edi}\|_2 \qquad (9)$$

where $V_{ori}$ represents invariant matrix 510 of original portrait 514, $V_{edi}$ represents invariant matrix 516 of edited portrait 515, and $\mathcal{L}_{ID}$ 506 is minimized by calculating the Frobenius norm between invariant matrix 510 and invariant matrix 516. As an example, original portrait 514 can be decomposed by an invariant encoder in trained encoder 513 to obtain invariant matrix 510, edited portrait 515 can be decomposed by an invariant encoder in trained encoder 517 to obtain invariant matrix 516, and the distance between the identities of original portrait 514 and edited portrait 515 is minimized by calculating $\mathcal{L}_{ID}$ 506 between invariant matrix 510 and invariant matrix 516.

The equivariant loss $\mathcal{L}_{eq}$ 508 may be used for ensuring existence or enhancement of the attribute assigned by the user, namely, minimizing the distance between assigned features such as happiness and assigned expressions in edited portrait 515, which can be represented by the following formula:

$$\mathcal{L}_{eq} = \|U_{ori} - U_{edi}\|_2 \qquad (10)$$

where $U_{ori}$ represents equivariant matrix 504 of image 509, $U_{edi}$ represents equivariant matrix 518 of edited portrait 515, and $\mathcal{L}_{eq}$ 508 is minimized by calculating the Frobenius norm between equivariant matrix 504 and equivariant matrix 518. As an example, image 509 can be decomposed by an equivariant encoder in trained encoder 505 to obtain equivariant matrix 504, edited portrait 515 can be decomposed by an equivariant encoder in trained encoder 517 to obtain equivariant matrix 518, and the distance between expressions of image 509 and edited portrait 515 is minimized by calculating $\mathcal{L}_{eq}$ 508 between equivariant matrix 504 and equivariant matrix 518.

The L2 loss $\mathcal{L}_{L2}$ 507 is used for preventing artifact generation, and may be represented as:

$$\mathcal{L}_{L2} = \|c - (c + \Delta c)\|_2 \qquad (11)$$

where c represents an interlayer vector, c+Δc represents an optimized implicit vector, and $\mathcal{L}_{L2}$ is minimized by calculating the Frobenius norm between the interlayer vector and the optimized implicit vector.

Schematic diagrams of generating a point cloud model based on the method described by the present disclosure and generating a point cloud model based on other technologies will be described with reference to FIG. 6 to FIG. 8. Experiments mainly depend on a ShapeNet (Core) data set. The present disclosure obeys AtlasNetV2 category selection, uses an airplane category and a chair category to perform single-category experiments, and uses all 13 categories in the ShapeNet (Core) data set for multi-category experiments. Unless otherwise noted, the present disclosure randomly samples 1024 points, for each shape, from a surface of an object so as to create the point cloud model.

For all the experiments, the present disclosure uses an Adam optimizer, an initial learning rate is 0.001, and an attenuation rate is 0.1. Unless otherwise noted, the present disclosure uses k=10 and a feature dimension d=128 for the experiments.

A network architecture of the present disclosure may include (1) an encoder, where the architecture of the present disclosure further includes, in addition to the elements described in the specification, a point-mesh architecture with residual connection and attentive context normalization; and (2) a decoder, where as an example, the architecture of the decoder of the present disclosure may be similar to AtlasNetV2 (including a trainable mesh), which is not limited by the present disclosure.

Figure 6:
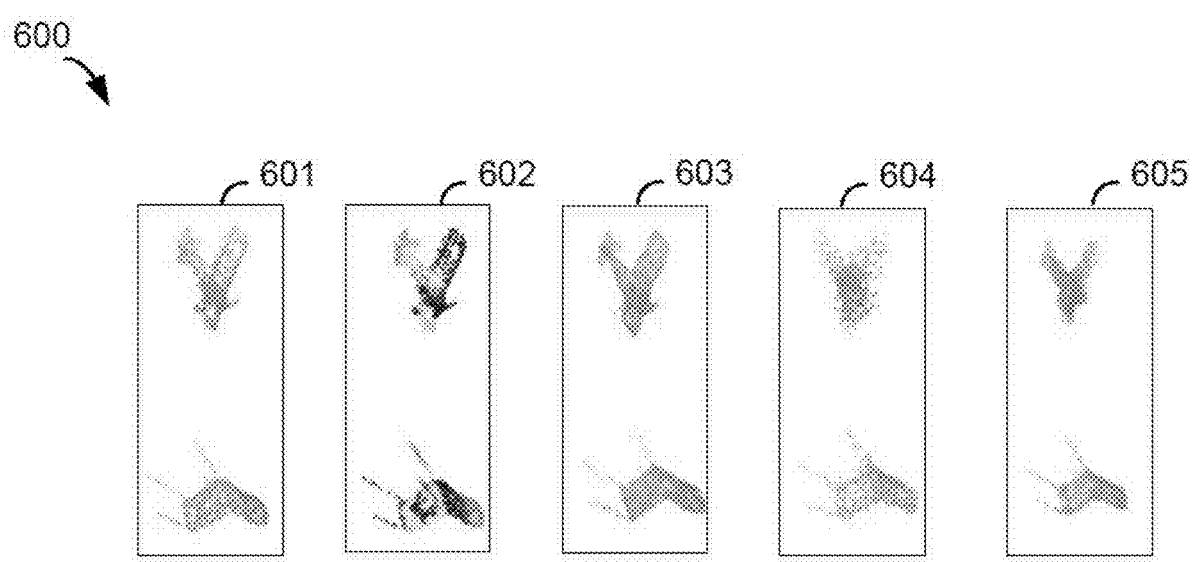
FIG. 6 illustrates a schematic diagram of reconstructing a point cloud model based on the method described by the present disclosure and reconstructing a point cloud model based on other technologies.

FIG. 6 describes schematic diagram 600 of reconstructing a point cloud model based on the method described by the present disclosure and reconstructing a point cloud model based on other technologies. Point cloud models representing an airplane and a chair respectively are inputted into block 601, block 602 represents decomposed data after decomposing the point cloud models in block 601, block 603 illustrates point cloud models reconstructed based on the present disclosure, block 604 illustrates point cloud models reconstructed based on a 3D-PointCapsNet encoder, and block 605 illustrates point cloud models reconstructed based on an AtlasNetV2 encoder. The 3D-PointCapsNet encoder is a 3D point cloud auto-encoder utilizing a capsule architecture. The AtlasNetV2 encoder is an auto-encoder utilizing a multihead-patch-based decoder.

It can be observed from FIG. 6 that the point cloud models reconstructed based on the present disclosure have more consistent component divisions. For example, colors of wings of the airplane are more consistent.

Table 1 shows performance measurement in an aspect of chamfer distance, and experimental results are as below:

TABLE 1

|  | Aligned | | | Unaligned | | |
| --- | --- | --- | --- | --- | --- | --- |
|  | Airplane | Chair | Multiple kinds | Airplane | Chair | Multiple kinds |
| 3D-PointCapsNet | 1.94 | 3.3 | 2.49 | 5.58 | 7.57 | 4.66 |
| AtlasNetV2 | 1.28 | 2.36 | 2.14 | 2.8 | 3.98 | 3.08 |
| The present disclosure | 0.93 | 2.01 | 1.66 | 1.05 | 3.75 | 2.2 |

It can be seen from Table 1 that the method described by the present disclosure has performance superior to that of 3D-PointCapsNet and AtlasNetV2.

Figure 7:
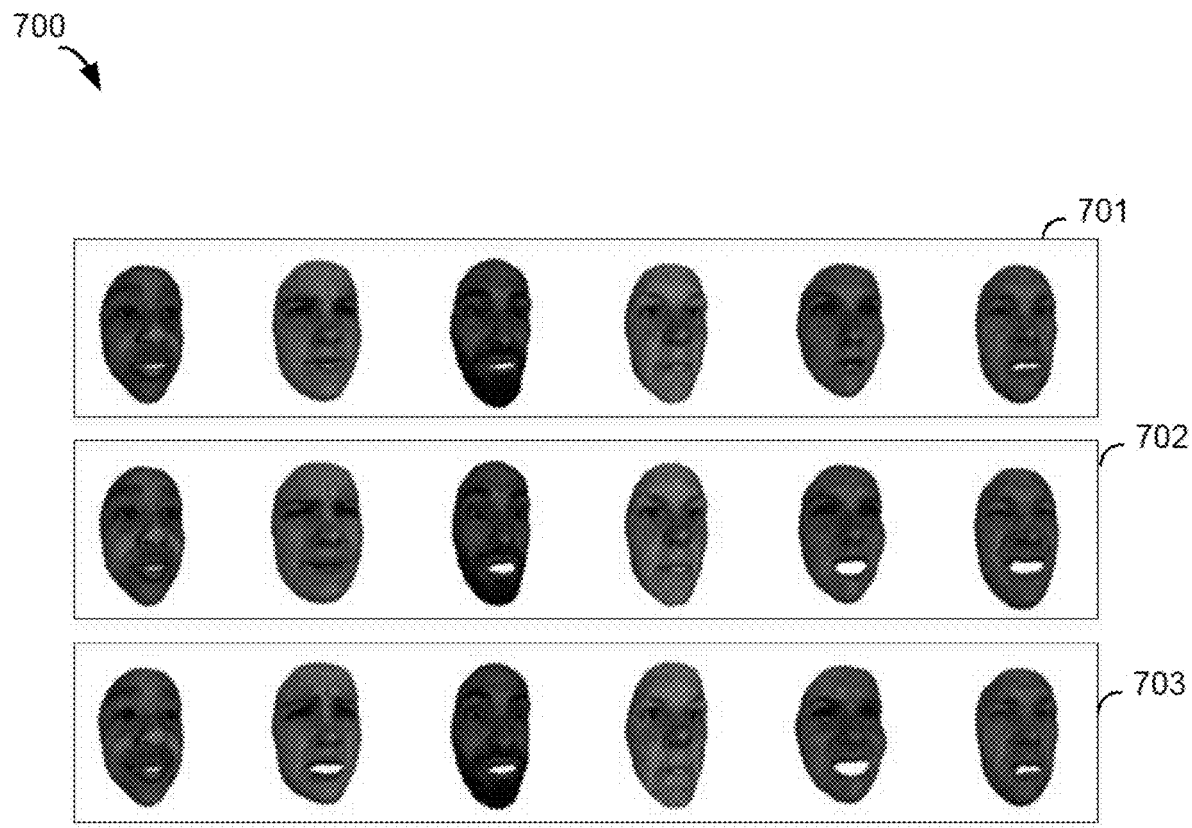
FIG. 7 describes a schematic diagram of classifying point cloud models based on the method described by the present disclosure and classifying point cloud models based on other technologies.

FIG. 7 describes schematic diagram 700 of classifying point cloud models based on the method described by the present disclosure and classifying point cloud models based on other technologies. Expressions are sequentially classified, from left to right, into happiness, depression, astonishment, anger, fear, and hate. In addition, block 701 is an original point cloud model, block 702 is a point cloud model generated based on TBGAN, and block 703 is a point cloud model generated based on the present disclosure. It can be seen from FIG. 7 that the point cloud model generated based on the present disclosure better conforms to the original point cloud model, and the expressions are more obvious.

Table 2 shows accuracy of classifying point cloud models by different encoders, which is shown as below:

TABLE 2

|  | Aligned | | Unaligned | |
| --- | --- | --- | --- | --- |
|  | SVM | K-means | SVM | K-means |
| 3D-PointCapsNet | 94.07 | 61.66 | 71.13 | 14.59 |
| AtlasNetV2 | 93.81 | 65.87 | 64.85 | 17.12 |
| The present disclosure | 93.78 | 71.42 | 86.58 | 49.93 |

Support vector machine (SVM) and K-Means clustering are used to perform 13 kinds of classification. Results of the present disclosure are superior to those of other methods. Thus, it is very important for unsupervised learning to combine invariant feature learning with equivariant feature learning by using the present disclosure. It is particularly obvious to unaligned parts because of the advantages of invariant features and equivariant features learned in this disclosure. The present disclosure may also acquire competitive results for aligned parts.

Figure 8:
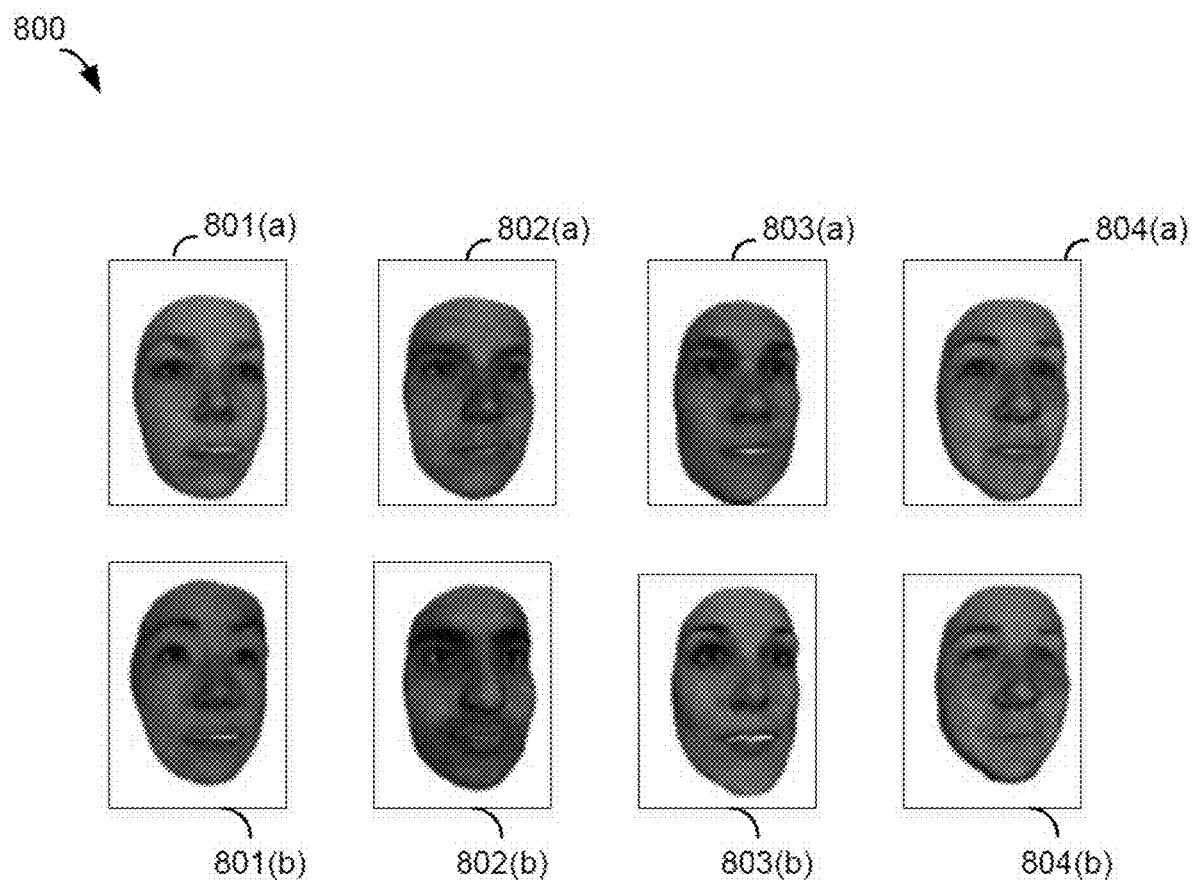
FIG. 8 describes an effect diagram of operating a generated model based on keywords with different semantics in the present disclosure.

FIG. 8 describes effect diagram 800 of operating a generated model based on keywords with different semantics in the present disclosure. Point cloud model 801(a) and a keyword "Asian" are input into an encoder implemented according to the present disclosure, so that Asian-like portrait 801(b) can be obtained. Point cloud model 802(a) and a keyword "Indian" are input into the encoder implemented according to the present disclosure, so that Indian-like portrait 802(b) can be obtained. Point cloud model 803(a) and a keyword "woman" are input into the encoder implemented according to the present disclosure, so that woman-like portrait 803(b) can be obtained. Point cloud model 804(a) and a keyword "man" are input into the encoder implemented according to the present disclosure, so that man-like portrait 804(b) can be obtained. It indicates that the present disclosure provides global semantic understanding about "man," "woman," "Asian," "Indian," and other more complex attributes. Additionally or alternatively, the present disclosure may further perform complex editing such as changing race and gender.

Figure 9:
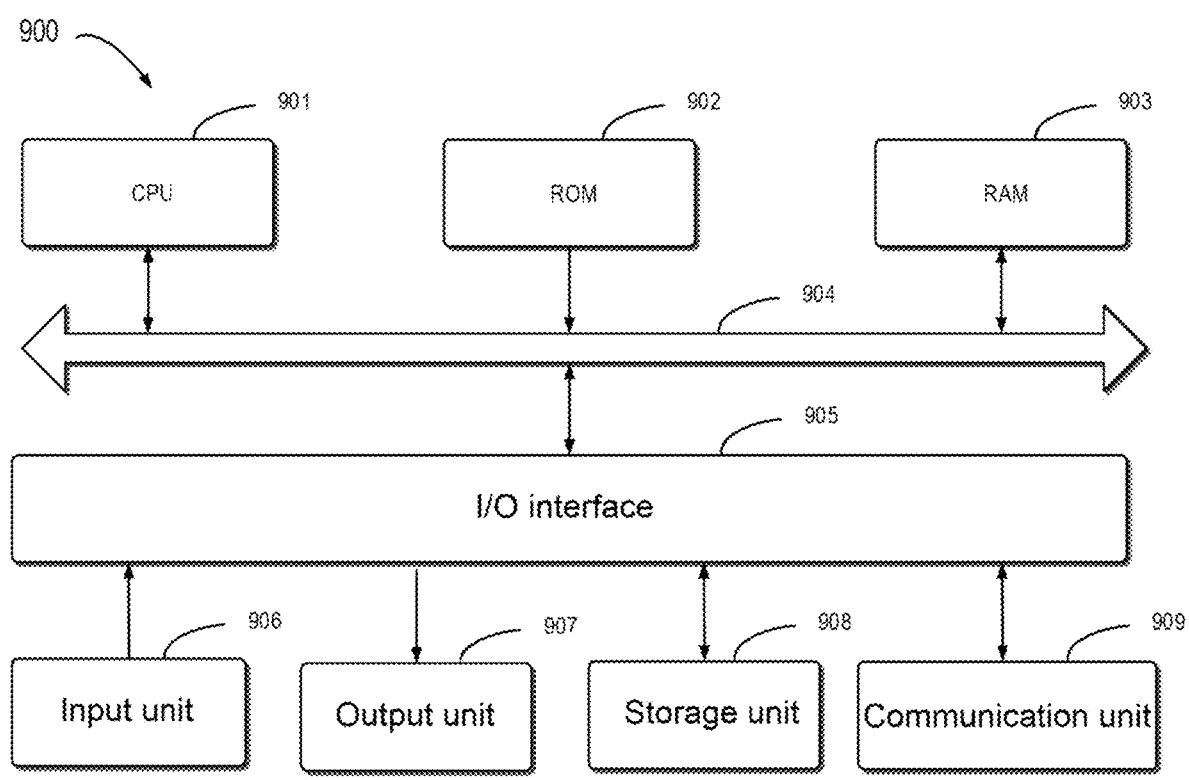
FIG. 9 illustrates a schematic block diagram of an example device which may be configured to implement embodiments of the present disclosure.

FIG. 9 illustrates a schematic block diagram of example device 900 which may be configured to implement embodiments of the present disclosure. Elements in FIG. 1 may be implemented by device 900. As shown in the figure, device 900 includes central processing unit (CPU) 901 which may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to one another through a bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as process 200, may be performed by CPU 901. For example, in some embodiments, process 200 may be implemented as a computer software program that is tangibly included in a machine-readable medium, such as the storage unit 908. In some embodiments, part or all of the computer program may be loaded and/or installed onto device 900 via ROM 902 and/or communication unit 909. When the computer program is loaded into RAM 903 and executed by CPU 901, one or more actions of process 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet by using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce apparatuses for implementing functions/actions specified in one or a plurality of blocks in the flow charts and/or block diagrams. These computer-readable program instructions may also be stored in the computer-readable storage medium, and these instructions cause the computer, the programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to the computer, the further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the accompanying drawings illustrate the architectures, functions, and operations possibly implemented by the system, the method and the computer program product according to various embodiments of the present disclosure. In this regard, each block in the flow charts or block diagrams may represent a module, a program segment, or part of an instruction, the module, program segment, or part of the instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons) of ordinary skill in the art to understand the embodiments disclosed herein.

What is claimed is:

1. A method comprising:
encoding first data of a point cloud model to obtain a first matrix;
encoding second data of the point cloud model to obtain a second matrix, wherein the first data and the second data are data of the point cloud model acquired from different angles;
respectively decomposing, by an equivariant encoder, the first matrix and the second matrix into a first equivariant matrix and a second equivariant matrix, wherein the equivariant encoder is configured to encode data inside the point cloud model;
respectively decomposing, by an invariant encoder, the first matrix and the second matrix into a first invariant matrix and a second invariant matrix, wherein the invariant encoder is configured to encode data of the point cloud model relative to a physical space; and
training the equivariant encoder and the invariant encoder based on the first equivariant matrix, the second equivariant matrix, the first invariant matrix, and the second invariant matrix.

2. The method according to claim 1, wherein training the equivariant encoder based on the first equivariant matrix and the second equivariant matrix comprises:
adjusting, through linear transformation, elements in the first equivariant matrix to correspond to elements in the second equivariant matrix, so as to make a similarity between the first equivariant matrix and the second equivariant matrix conform to a similarity threshold.

3. The method according to claim 1, wherein training the invariant encoder based on the first invariant matrix and the second invariant matrix comprises:
adjusting a Frobenius norm between the first invariant matrix and the second invariant matrix, so as to make the first invariant matrix consistent with the second invariant matrix.

4. The method according to claim 1, further comprising:
reconstructing the point cloud model based on one or more matrices in the first invariant matrix, the second invariant matrix, the first equivariant matrix, and the second equivariant matrix; and
training a decoder in reconstructing the point cloud model, so as to make a similarity between a point cloud model reconstructed by the decoder and the point cloud model conform to a similarity threshold.

5. The method according to claim 1, wherein the first invariant matrix and the second invariant matrix represent an absolute position of the point cloud model relative to the physical space.

6. The method according to claim 1, wherein the first equivariant matrix and the second equivariant matrix represent relative positions between the data in the point cloud model.

7. The method according to claim 1, wherein when the method is applied to generating a simulated face of a character, the first invariant matrix and the second invariant matrix represent an overall face outline of the simulated face of the character, and the first equivariant matrix and the second equivariant matrix represent facial expressions of the simulated face of the character.

8. The method according to claim 1, further comprising:
using the invariant encoder to decompose data of one or more point cloud models into one or more invariant matrices after the invariant encoder is trained; and
classifying the one or more point cloud models based on the one or more invariant matrices.

9. The method according to claim 1, further comprising:
using the equivariant encoder to decompose data of one or more point cloud models into one or more equivariant matrices after the equivariant encoder is trained;
dividing the one or more point cloud models based on the one or more equivariant matrices; and
identifying one or more elements of the one or more point cloud models based on divided parts of the one or more point cloud models.

10. An electronic device comprising:
at least one processor; and
a memory coupled to the at least one processor and having instructions stored therein, wherein the instructions, when executed by the at least one processor, cause the electronic device to perform actions comprising:
encoding first data of a point cloud model to obtain a first matrix;
encoding second data of the point cloud model to obtain a second matrix, wherein the first data and the second data are data of the point cloud model acquired from different angles;
respectively decomposing, by an equivariant encoder, the first matrix and the second matrix into a first equivariant matrix and a second equivariant matrix, wherein the equivariant encoder is configured to encode data inside the point cloud model;
respectively decomposing, by an invariant encoder, the first matrix and the second matrix into a first invariant matrix and a second invariant matrix, wherein the invariant encoder is configured to encode data of the point cloud model relative to a physical space; and
training the equivariant encoder and the invariant encoder based on the first equivariant matrix, the second equivariant matrix, the first invariant matrix, and the second invariant matrix.

11. The electronic device according to claim 10, wherein training the equivariant encoder based on the first equivariant matrix and the second equivariant matrix comprises:
adjusting, through linear transformation, elements in the first equivariant matrix to correspond to elements in the second equivariant matrix, so as to make a similarity between the first equivariant matrix and the second equivariant matrix conform to a similarity threshold.

12. The electronic device according to claim 10, wherein training the invariant encoder based on the first invariant matrix and the second invariant matrix comprises:
adjusting a Frobenius norm between the first invariant matrix and the second invariant matrix, so as to make the first invariant matrix consistent with the second invariant matrix.

13. The electronic device according to claim 10, further comprising:
reconstructing the point cloud model based on one or more matrices in the first invariant matrix, the second invariant matrix, the first equivariant matrix, and the second equivariant matrix; and
training a decoder in reconstructing the point cloud model, so as to make a similarity between a point cloud model reconstructed by the decoder and the point cloud model conform to a similarity threshold.

14. The electronic device according to claim 10, wherein the first invariant matrix and the second invariant matrix represent an absolute position of the point cloud model relative to the physical space.

15. The electronic device according to claim 10, wherein the first equivariant matrix and the second equivariant matrix represent relative positions between the data in the point cloud model.

16. The electronic device according to claim 10, wherein when the electronic device is applied to generating a simulated face of a character, the first invariant matrix and the second invariant matrix represent an overall face outline of the simulated face of the character, and the first equivariant matrix and the second equivariant matrix represent facial expressions of the simulated face of the character.

17. The electronic device according to claim 10, further comprising:
    using the invariant encoder to decompose data of one or more point cloud models into one or more invariant matrices after the invariant encoder is trained; and
    classifying the one or more point cloud models based on the one or more invariant matrices.

18. The electronic device according to claim 10, further comprising:
    using the equivariant encoder to decompose data of one or more point cloud models into one or more equivariant matrices after the equivariant encoder is trained;
    dividing the one or more point cloud models based on the one or more equivariant matrices; and
    identifying one or more elements of the one or more point cloud models based on divided parts of the one or more point cloud models.

19. A computer program product that is tangibly stored on a non-transitory computer-readable medium and comprises machine-executable instructions, wherein the machine-executable instructions, when executed by a machine, cause the machine to perform a method, the method comprising:
    encoding first data of a point cloud model to obtain a first matrix;
    encoding second data of the point cloud model to obtain a second matrix, wherein the first data and the second data are data of the point cloud model acquired from different angles;
    respectively decomposing, by an equivariant encoder, the first matrix and the second matrix into a first equivariant matrix and a second equivariant matrix, wherein the equivariant encoder is configured to encode data inside the point cloud model;
    respectively decomposing, by an invariant encoder, the first matrix and the second matrix into a first invariant matrix and a second invariant matrix, wherein the invariant encoder is configured to encode data of the point cloud model relative to a physical space; and
    training the equivariant encoder and the invariant encoder based on the first equivariant matrix, the second equivariant matrix, the first invariant matrix, and the second invariant matrix.

20. The computer program product according to claim 19, wherein when the method is applied to generating a simulated face of a character, the first invariant matrix and the second invariant matrix represent an overall face outline of the simulated face of the character, and the first equivariant matrix and the second equivariant matrix represent facial expressions of the simulated face of the character.

\* \* \* \* \*